(12) United States Patent
Kinderman et al.

(10) Patent No.: US 10,607,039 B1
(45) Date of Patent: Mar. 31, 2020

(54) CONSTRAINED METRIC OPTIMIZATION OF A SYSTEM ON CHIP

(71) Applicant: Cadence Design Systems, Inc., San Jose, CA (US)

(72) Inventors: Yael Kinderman, Giv'at Shmuel (IL); Shlomi Uziel, Neve Ilan (IL); Ido Avraham, Netanya (IL); Michele Petracca, Chappaqua, NY (US); Yosinori Watanabe, Lafayette, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 149 days.

(21) Appl. No.: 15/823,444

(22) Filed: Nov. 27, 2017

(51) Int. Cl.
  G06F 30/398 (2020.01)
  G05B 17/02 (2006.01)
  G06F 30/20 (2020.01)
  G06F 15/76 (2006.01)

(52) U.S. Cl.
  CPC .......... *G06F 30/398* (2020.01); *G05B 17/02* (2013.01); *G06F 30/20* (2020.01); *G06F 2015/763* (2013.01); *G06F 2015/768* (2013.01)

(58) Field of Classification Search
  CPC ............. G06F 17/5081; G06F 17/5009; G06F 2015/768; G06F 2015/763; G06F 30/398; G06F 30/20; G05B 17/02
  See application file for complete search history.

(56) References Cited

U.S. PATENT DOCUMENTS

2018/0197110 A1* 7/2018 Rao .................. G06N 20/00

OTHER PUBLICATIONS

Fine et al., "Coverage Directed Test Generation for Functional Verification Using Bayesian Networks," Design Automation Conference (DAC) 2003, 6 pages.

* cited by examiner

*Primary Examiner* — Nha T Nguyen
(74) *Attorney, Agent, or Firm* — McDermott Will & Emery LLP

(57) ABSTRACT

A method including receiving a first configuration of a device validated against a design constraint, is provided. A configuration includes stimuli controls and stimuli parameters used as inputs in a device model. The method includes determining a quality of the first configuration based on an estimation of an output parameter including a desired behavior of the device, simulating the device in the first configuration when the first configuration quality overcomes a threshold, and requesting a second configuration of the device when the quality of the first configuration is below the selected threshold. The method also includes obtaining a regression based on multiple, high quality configurations to determine, for the device, a distribution of output parameter values and comparing the distribution of output parameter values with a baseline of a random regression to adjust the machine learning engine according to a target range of output parameter values.

18 Claims, 12 Drawing Sheets

CONSTRAINED METRIC OPTIMIZATION OF A SYSTEM ON CHIP

TECHNICAL FIELD

Embodiments described herein are generally related to the field of constrained statistical analysis of integrated circuit designs. More specifically, embodiments described herein are related to methods for performing a constrained analysis of integrated circuit designs including hardware and software.

BACKGROUND

Current integrated circuit (IC) design is largely dedicated to large systems integrating software and hardware to perform multiple tasks simultaneously, or almost simultaneously. Some of these designs include system on a chip (SoC) configurations, typically designed to execute different applications that compete for system resources (e.g., memory, processor time, and bus bandwidth). Due to a large number of operating parameters to consider, system designers typically explore obvious extreme parameter corners that may render inefficient design architectures. Moreover, some combinations of parameter values may be overlooked, resulting in system flaws that may be unrecoverable in certain situations. Also, in some situations it may be desirable for a designer to perform a "what if" analysis, in which input parameters are constrained to pre-selected values to determine what is the outcome in SoC performance. In such circumstances, it is desirable to have a tool that systematically and exhaustively explores the parameter space to highlight the areas where a distinction between two different configurations is clear, including input parameter constraints and dependencies.

The description provided in the background section should not be assumed to be prior art merely because it is mentioned in or associated with the background section. The background section may include information that describes one or more aspects of the subject technology.

SUMMARY

In certain aspects, a computer-implemented method includes receiving a first configuration of a device, wherein a configuration includes stimuli controls and stimuli parameters used as inputs in a device model, and wherein the first configuration is validated against a design constraint. The computer-implemented method also includes determining, with a machine learning engine, a quality of the first configuration based on an estimation of an output parameter, wherein the output parameter includes a desired behavior of the device, and simulating the device in the first configuration of the device when the quality of the first configuration is above a selected threshold. The computer-implemented method also includes requesting a second configuration of the device when the quality of the first configuration is below the selected threshold, obtaining a regression based on multiple configurations to determine, for the device, a distribution of output parameter values. Each configuration in the regression has a quality above the selected threshold. The computer-implemented method also includes comparing the distribution of output parameter values with a baseline of a random regression to adjust the machine learning engine according to a target range of output parameter values.

In certain aspects, a system is described. The system includes a memory storing instructions, and at least one processor that executes the instructions to receive a first configuration of a device, wherein a configuration includes stimuli controls and stimuli parameters used as inputs in a device model, and wherein the first configuration is validated against a design constraint. The at least one processor also executes the instructions to determine, with a machine learning engine, a quality of the first configuration based on an estimation of an output parameter, wherein the output parameter includes a desired behavior of the device, to simulate the device in the first configuration of the device when the quality of the first configuration is above a selected threshold, and to request a second configuration of the device when the quality of the first configuration is below the selected threshold. The at least one processor also executes the instructions to obtain a regression based on multiple configurations to determine, for the device, a distribution of output parameter values. Each configuration in the regression has a quality above the selected threshold. The at least one processor also executes the instructions to compare the distribution of output parameter values with a baseline of a random regression to adjust the machine learning engine according to a target range of output parameter values.

In certain aspects, a non-transitory, machine-readable storage medium is described that includes machine-readable instructions for causing a processor to execute a method. The method includes receiving a first configuration of a device, wherein a configuration includes stimuli controls and stimuli parameters used as inputs in a device model, and wherein the first configuration is validated against a design constraint, and determining, with a machine learning engine, a quality of the first configuration based on an estimation of an output parameter, wherein the output parameter includes a desired behavior of the device. The method also includes simulating the device in the first configuration when the quality of the first configuration is above a selected threshold and requesting a second configuration of the device when the quality of the first configuration is below the selected threshold. The method also includes obtaining a regression based on multiple configurations to determine, for the device, a distribution of output parameter values. Each configuration in the regression has a quality above the selected threshold. The method also includes comparing the distribution of output parameter values with a baseline of a random regression to adjust the machine learning engine according to a target range of output parameter values.

In certain aspects, a system is described including a means for storing instructions. The system further includes a means to execute the instructions to receive a first configuration of a device, wherein a configuration includes stimuli controls and stimuli parameters used as inputs in a device model, and wherein the first configuration is validated against a design constraint. The means to execute the instructions also executes the instructions to determine, with a machine learning engine, a quality of the first configuration based on an estimation of an output parameter, wherein the output parameter includes a desired behavior of the device, to simulate the device in the first configuration of the device when the quality of the first configuration is above a selected threshold, and to request a second configuration of the device when the quality of the first configuration is below the selected threshold. The means to execute the instructions also executes the instructions to obtain a regression based on multiple configurations to determine, for the device, a distribution of output parameter values. Each configuration in the regression has a quality above the selected threshold. The means to execute the instructions also executes the instructions to compare the distribution of output parameter values with a baseline of a random regression to adjust the machine learning engine according to a target range of output parameter values.

BRIEF DESCRIPTION OF THE DRAWINGS

In the figures, elements and steps denoted by the same or similar reference numerals are associated with the same or similar elements and steps, unless indicated otherwise.

DETAILED DESCRIPTION

Figure 1:
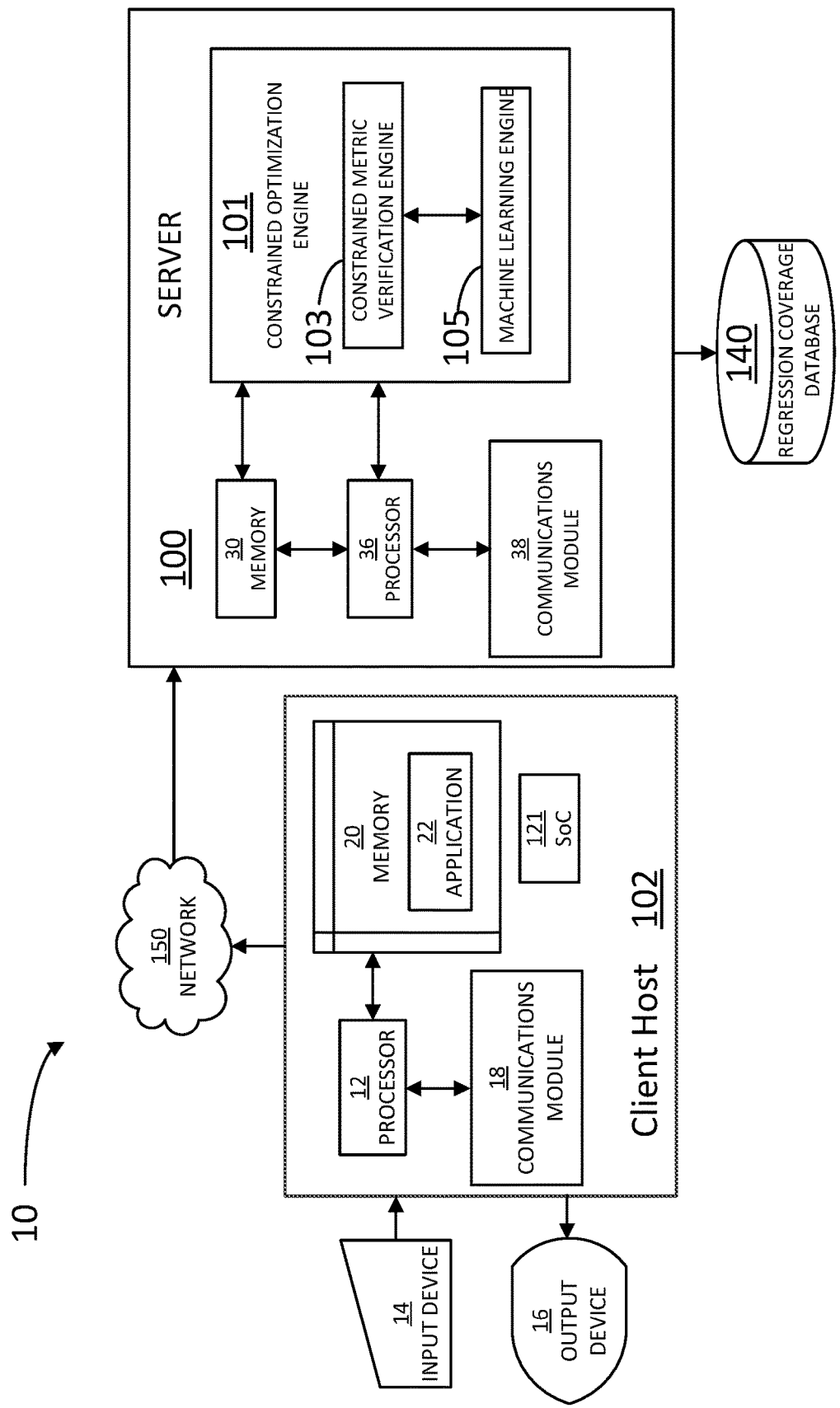
FIG. 1 illustrates an architecture configured to perform constrained metric verification analysis of a SoC, according to some embodiments.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Embodiments disclosed herein include a constrained optimization engine for providing constrained analysis of a system architecture (e.g., a SoC) using simulation data obtained with suitably combined parameters to address a target range of values for an output parameter. A constrained analysis allows a designer to explore areas of a device parameter space to model the system architecture according to a specific environment and input parameter values. The environment may include physical environmental properties such as temperature, or user-related properties such as rate of use (e.g., data traffic, network conditions, and the like), and type of application. SoC designers make use of multiple input blocks including memories, processors, and the like, e.g., "external devices and software." External devices and software may be provided by multiple vendors and have device parameters that can be adjusted by the designer when assembling the multiple devices into a SoC. During assembly, in some embodiments the designer may use an application that configures the parameters for the different external devices and software to study the performance of the SoC to identify device parameters that may be changed, and how. In some embodiments, multiple external device and software blocks (e.g., "Verification IPs"), each with their set of parameters, may be assembled to create a complex verification environment.

Typically, a constrained random regression includes a random selection of input parameters, leading to SoC performance that misses a target coverage model, including "hard to get" states and output parameters of the SoC (e.g., "deep states"). Furthermore, steering regression parameters in device simulation to reach areas of interest involves laborious manual analysis. Current systems include dedicated tests dedicated to bias the simulation toward a desired output, which introduces undesirable bias in the analysis that may obscure results otherwise obtained with a random test.

Methods as disclosed herein resolve the above problem by combining a constrained optimization engine with a machine-learning algorithm that is trained to efficiently predict whether a seed configuration will lead to an output parameter value within a target range of values. Accordingly, some embodiments as disclosed herein can be seen as an "oracle" that predicts the quality of a device configuration, by looking at its input parameter, without actually simulating the SoC with it. Thus, methods and systems consistent with the present disclosure enable full SoC simulations to be executed when it is highly likely that the output parameter will fall within a desired target range (e.g., have "high quality").

While the word configuration is used in some embodiments to indicate a plurality of values for input parameters in a parameter space of a device (e.g., a SoC), a more general scope of a "configuration" as described hereinafter includes "stimuli controls," or "stimuli parameters" that may be used as inputs to evaluate, simulate, or emulate the performance of a SoC. Embodiments as disclosed herein modify existing test environments for a Design Under Test (DUT, e.g., the SoC) by injecting a smart "moderator" based on machine learning algorithms oriented to stress the DUT behavior and enable a designer to identify bugs and other performance failures faster, thus improving the overall coverage and accuracy of the DUT analysis.

Some embodiments as disclosed herein include methods to dynamically extract status with regards to a given target coverage for an output parameter of a SoC from regression raw data (e.g., to extract for each run, how "good" is the run with regard to the desired goal).

In SoC design, three types of properties available to the designer may be distinguished. A first type includes properties that can be directly configured (controllable properties) by the designer. For example, some controllable properties of a system may include the depth of a first-in-first-out (FIFO) buffer, a memory size (e.g., in kilobytes KB, megabytes, MB, gigabytes GB, and the like) or the clock frequency at which certain circuit component operates, or a bus bandwidth. Other controllable properties may include a bandwidth of a port (input/output) in a bus or a memory interface, or a read/write weight ratio in the port. The designer sets proper values for the controllable properties to optimize the design. A second type includes properties that the designer may desire to monitor during simulation (observable properties). Observable properties may describe the "quality" of the design. One example of an observable property may include the latency of a given operation (e.g., a command execution such as a read/write operation, or a logic operation, or a hardware reconfiguration), or a device bandwidth (e.g., usage of an IP for a selected operation or function). Without limitation, the designer may have no control as to the value of an observable property. Accordingly, the designer may set up quantitative measurements of the observable properties to collect data during simulation. A third type includes properties of the environment (environmental properties) in which the design is expected operate. The designer does not control these properties, (e.g., the use rate of the SoC and the like). In some embodiments, the environmental properties may be included in the constrained optimization engine as test bench parameters to evaluate the performance of a SoC under different conditions. In what follows, and without limitation, controlled properties and environmental properties will be lumped together as "input parameters," and at least some observable properties will be referred to as "output parameters."

In some embodiments, and without limitation, a constrained optimization engine as disclosed herein may include a software parameter for a SoC, such as logic commands, in addition to hardware properties (e.g., a compiler parameter). Compiler parameters may determine the type of executable program that runs the SoC, which may impact its performance. In some embodiments, a software parameter for a SoC may include a specific algorithm implementation to achieve the same result (e.g., the same type of hardware control or data processing). Further, in some embodiments software parameters may include different constants to, for instance, change the degree of accuracy, the precision, the amount of buffering, or the number of processes or threads in an application. In some embodiments, software parameters for a SoC may involve a tradeoff between speed, power requirements, resource footprint, signal-to-noise ratios, and the like, which the designer may desire to evaluate in detail. Further, software parameters for a SoC in embodiments consistent with the present disclosure may include a selection of whether to run an algorithm on a central-processing unit (CPU), or in a graphics-processing unit (GPU). In this regard, the designer may desire to evaluate trade-offs between power requirements, performance, and complexity by selecting between CPU and GPU execution.

In some embodiments, a constrained optimization engine may use a regression coverage database storing data obtained through a campaign of SoC simulations. Each simulation reports measurements for at least one output parameter under a certain device configuration determined by selected input parameters. Based on data collected from the measurements and stored in the system performance database, the constrained optimization engine renders a statistical model of the system that highlights the dependency of the "observable" featured from the "environment" and "controllable" ones. The resulting data enables the designer to predict the effect of the tests on the concerning verification metric(s) (e.g., after certain assumptions about the environment) and to configure the testing environment such as to bring a design under test (e.g., the SoC) to selected conditions during testing. Accordingly, the constrained analysis engine provides a profile of design parameters to achieve a desired performance of a SoC, including hardware and software.

Systems and methods as disclosed herein provide an a-priori knowledge (or close estimate) of device configurations that may lead to an output parameter within a given range. Embodiments as disclosed herein provide this a-priori knowledge at substantially no cost or extra time for the user, as these processes may be fully automated. Embodiments as disclosed herein also provide analysis and testing tools for verifying and improving regression results in view of the random nature of the tests and regression.

The disclosed system addresses a technical problem tied to computer technology and arising in the realm of computer simulation of hardware, namely the technical problem of accurately analyzing the performance of a SoC having multiple device and software parameters with the goal of targeting a desired output parameter range. Accordingly, in some embodiments a machine-learning algorithm selects device configurations having higher probability to reach the output parameter goal, without the need to actually run a full simulation of a SoC.

Some embodiments combine a quality predictor algorithm with a random selection of input parameters for a device configuration. The quality predictor algorithm is configured to only filter the valid device configurations having high quality. A high quality device configuration is such that there is a high probability that, when a full simulation is run with the input parameters of the device configuration, the output parameter will fall within a targeted range.

Some embodiments, a machine learning engine applies a quality distribution bias selects an assignment to an input parameter to improve the quality of a given device configuration. After a series of iterations, the machine-learning engine is expected to be better trained for selecting the input parameters leading to the desired output parameter values.

Accordingly, methods and systems as disclosed herein improve analysis results for SoCs as compared with random regression, wherein it may be very difficult to achieve a desired target range for the output parameter. Further, in some embodiments the machine-learning engine operates to select and predict device configurations, rather than actually applying a full simulation. Further, the heuristic approach currently used by savvy users is avoided, thereby providing repeatable, objective results.

Some embodiments enable a user to interactively steer a target coverage range for an output parameter toward which we enable steering, rather than fixing a pre-defined target. This approach may in fact provide a more rapid convergence of the engine to areas of parameter space that are of interest for the user.

Furthermore, computer-implemented methods as disclosed herein are independent of platform used to install, compile and run (e.g., simulation/emulation/ . . . , specific language, specific generator, and the like), and enable capture of multiple high quality device configurations ("high" recall) without limitation by generation langue specifics. Moreover, computer-implemented methods as disclosed herein give the user flexibility and control over target range definition because the predictive nature of the machine-learning algorithm substantially reduces the amount of full simulation runs. In embodiments as disclosed herein a target coverage range and the specific output parameter itself may be arbitrarily selected by the user, as long as it can be extracted from run raw data.

Example System Architecture

FIG. 1 illustrates an architecture 10 configured to perform a constrained metric verification analysis of a SoC, according to some embodiments. A client host 102 includes a processor 12 configured to execute instructions stored in a memory 20. Memory 20 may include an application 22, which includes commands that when executed by processor 12 cause client host 102 to perform methods consistent with the present disclosure. Application 22 may include a runtime software program running on client host 102 to issue commands to server 100 for controlling a constrained optimization engine 101. For example, application 22 may include an application to control server 100 for SoC 121. SoC 121 may include a register transfer level (RTL) compiler language, e.g., an application specific integrated circuit (ASIC) RTL file configured to handle hardware and software that controls the hardware. Client host 102 may also include a communications module 18 that enables client host 102 to transfer data, provide commands and receive instructions from server 100 through a network 150. Client host 102 may be coupled with an input device 14 (e.g., a mouse, a keyboard, a touch screen display, and the like) and to an output device 16 (e.g., a display, a speaker, and the like). Accordingly, a user may enter commands and queries to client host 102 with input device 14, and receive graphic and other information from client host 102 via output device 16. In some embodiments, application 22 may control input device 14 and output device 16 through a graphic user interface (GUI), enabling a user to have access to server 100 and perform a constrained metric verification analysis on SoC 121.

Server 100 may include a memory 30, a processor 36, and a communications module 38 to transfer data, receive commands and provide instructions from client host 102 through network 150. Memory 30 and processor 36 may be communicatively coupled with a constrained optimization engine 101 that includes a constrained metric verification engine 103 and a machine learning engine 105. In some embodiments, constrained optimization engine 101 is configured to perform simulations of SoC 121 with selected input parameters to obtain selected output parameters and store the selected output parameters in regression coverage database 140. Machine learning engine 105 may perform an iterative regression analysis to develop a model, or correlation, between at least some of the input parameters and at least some of the output parameters. Constrained metric verification engine 103 may be configured to selectively apply constraints to input parameters and to output parameters before a simulation run, or after a simulation run, for data stored in and retrieved from regression coverage database 140. Accordingly, in some embodiments, constrained metric verification engine 103 may be configured to apply constraints so that the output parameter of at least some configurations resulting from the simulation and stored in regression coverage database 140 include a selected target range. Thereafter, machine learning engine 105 applies regression algorithms on the constrained data retrieved from regression coverage database 140. This process may be iterated a number of times, until the output parameter falls satisfactorily within the target range.

A regression coverage database 140 stores data results from multiple simulation samples on SoC 121 run with server 100. In some embodiments, regression coverage database 140 stores values of environmental properties, controllable properties, and observable properties resulting from multiple simulations of SoC 121.

In some embodiments, constrained optimization engine 101 initially performs simulations over a limited sampling of the device (and software) parameter space with selected system configurations. In the simulations, given a system configuration, a random selection of data traffic is provided to SoC 121 and the results of the simulations are stored in regression coverage database 140. For example, in some embodiments the random selection of data may include sets of video frames formed from random pixel values (e.g., when the SoC 121 is a video-cam controller). In some embodiments, the simulations may include sets of video frames selected at random from other video frames or pictures available to Server 100. The results stored in regression coverage database 140 may include values of selected observable properties of the SoC. Based on the results, and using machine-learning techniques from prior simulation history stored in regression coverage database 140, constrained metric verification engine 103 and machine learning engine 105 select additional simulation configurations to provide a refined analysis. Accordingly, constrained metric verification engine 103 and machine learning engine 105 increases the simulation and analysis efficiency by concentrating on areas of the parameter space for controllable and environmental properties that are critical for performance of SoC 121 (e.g., desirable ranges of one or more observable properties).

Figure 2:
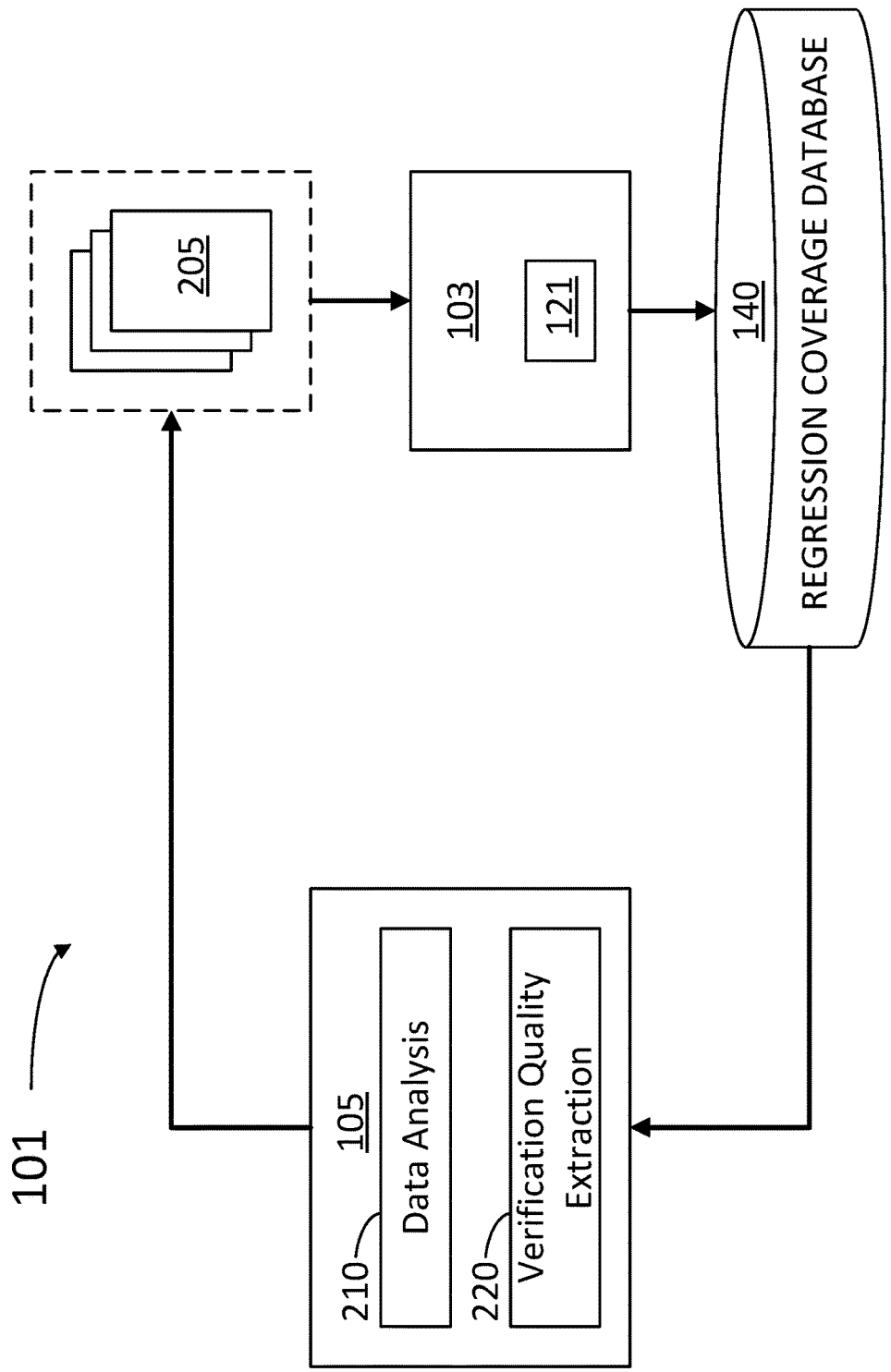
FIG. 2 illustrates a block diagram of an analysis engine for constrained metric verification of a SoC, according to some embodiments.

FIG. 2 illustrates a block diagram of a constrained optimization engine 101 for constrained metric verification of a SoC 121, according to some embodiments. Machine learning engine 105 includes a data analysis block 210 and a verification quality (VQ) extraction block 220. A dataset 205 is the input to constrained metric verification engine 103. In some embodiments, dataset 205 includes test intent and configuration data for SoC 121. Accordingly, analysis engine 105 performs a simulation of SoC given input parameters as selected by constrained metric verification engine 103 from dataset 205. The simulation results are stored in regression coverage database 140 to be used by machine learning engine 105. In an iterative process, machine learning engine 105 may provide a new dataset 205 based on the regression results, so as to bias the simulation coverage towards a specific target range, or target value.

Figure 3:
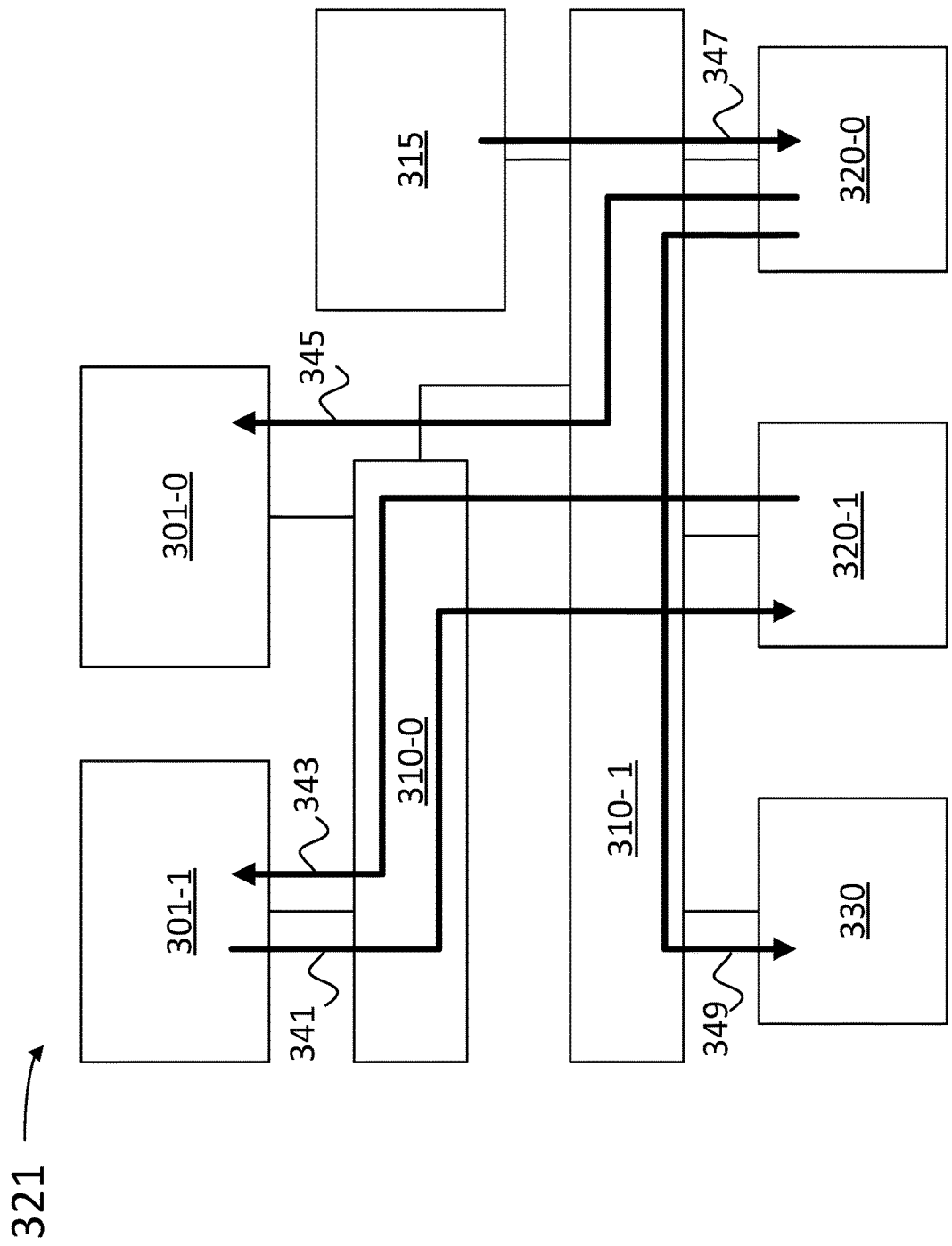
FIG. 3 illustrates a SoC configured to perform operations under controllable parameters and environmental parameters, according to some embodiments.

FIG. 3 illustrates a SoC 321 configured to perform operations in a configuration described by input parameters and output parameters (or concerns), according to some embodiments. The operations result in output (observable) parameters, desirably within a target coverage range. Without limitation, SoC 321 includes two CPUs 301-0 and 301-1 (collectively referred to, hereinafter, as "CPUs 301"), and two memories 320-0 and 320-1 (collectively referred to, hereinafter, as "memories 320"). Memories 320 may include volatile memories such as FIFO buffers, random access memories (RAMs) including dynamic RAMs (DRAMs), static RAMs (SRAMs), and the like. In some embodiments, memories 320 may also include non-volatile memories such as a flash memory, a disk memory (e.g., a hard drive), or any other magnetic device. CPUs 301 are coupled with memories 320 through buses 310-0 and 310-1 (collectively referred to, hereinafter, as "buses 310"). In some embodiments, buses 310 may include a memory interface circuit, e.g., a double data-rate (DDR) circuit having multiple ports (input/output). A traffic source 315 injects traffic 347 (e.g., data) to be processed by either of CPUs 301, and a traffic sink 330 removes data 349 form SoC 321 (e.g., to clear memories 320, or to send data 349 to an external memory or other SoC). Without limitation, traffic source 315 injects data 347 into memory 320-0. Thereafter, CPU 301-0 may access a data portion 345 from memory 320-0, to perform a first operation (e.g., run a background function). Likewise, CPU 301-1 may access a data portion 343 from memory 320-0 to perform a second operation (e.g., run a first function independent of the background function).

Accordingly, a SoC designer may use constrained optimization engine 101 to address the impact of frame rate on computation latency for the first function by SoC 321 under different environmental conditions. The SoC designer may then apply constraints to the different input parameters and output parameters (e.g., through constrained metric verification engine 103) to verify the performance of the SoC, which may be focused on the frame rate for executing the first function.

Figure 4:
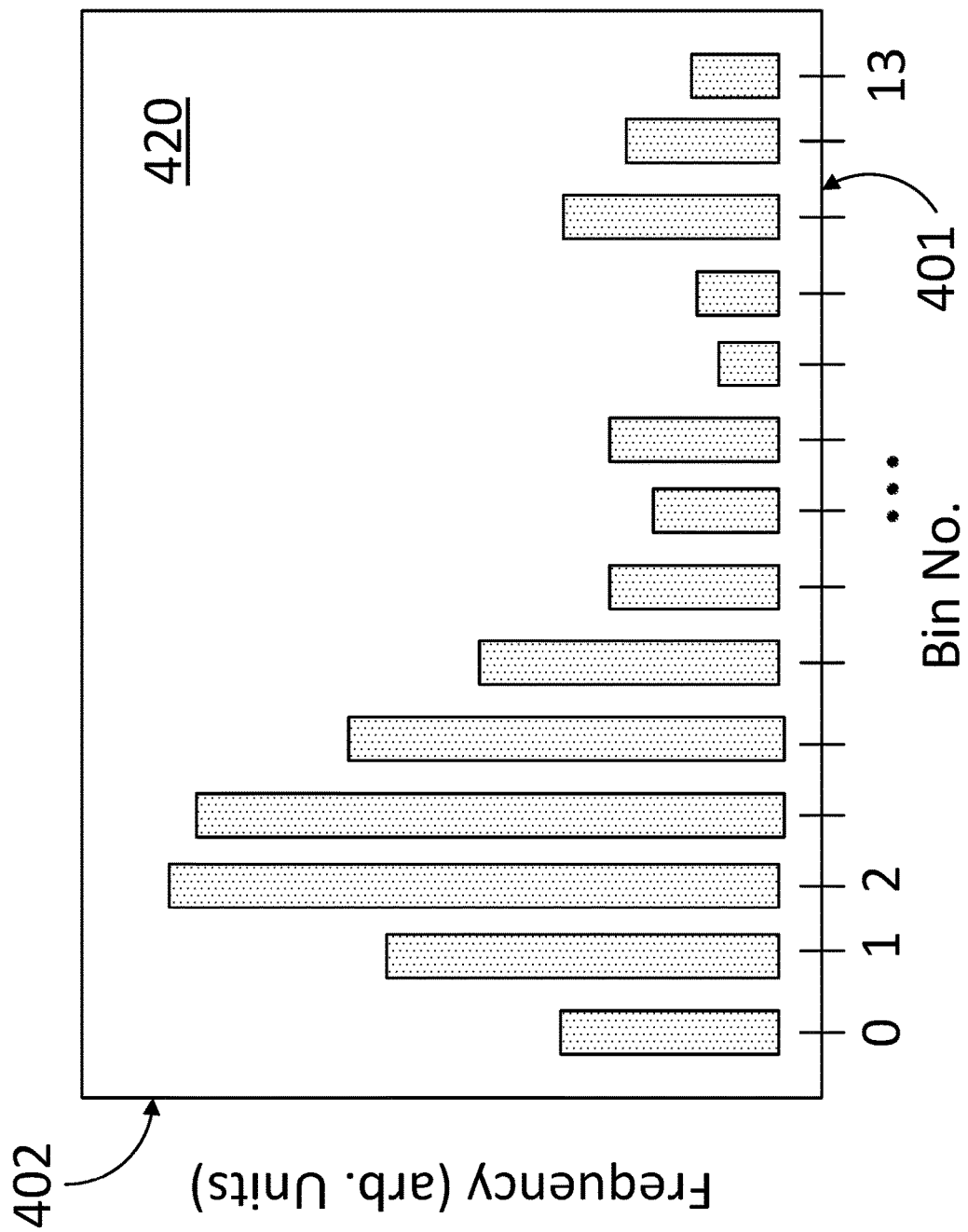
FIG. 4 illustrates a distribution of results from a random selection of input parameters in a SoC, according to some embodiments.

FIG. 4 illustrates a distribution 420 of output parameter values from a random selection of input parameters in a SoC simulation, according to some embodiments. For example, distribution 420 may include five thousand (5000), or more samples simulated by constrained optimization engine 101 without any constraint (e.g., an unconstrained, random selection of device configurations). Without limitation, a test environment for the SoC in distribution 420 may include a DDR interface having up to one hundred and forty (140) input parameters, while the output parameter may be selected as a read transaction latency of the DDR. Furthermore, in some embodiments it may be desirable to explore configurations for input parameter values resulting in a higher read latency of the DDR. Each sample corresponds to a configuration having randomly selected values for input parameters. Distribution 420 includes a frequency 402 (ordinates, or Y-axis) of occurrence of the output value within a specific bin 401 (abscissae, or X-axis). Bins 401 span a range of parameter values from bin 1 (lowest parameter value with non-zero frequency 402), to bin 12 (highest parameter value with non-zero frequency). In some embodiments, the designer, according to certain design considerations, selects the number of bins in distribution 420. Moreover, in some embodiments each bin 401 may have the same width. Further, in some embodiments at least two or more contiguous bins 401 may be coalesced to form a partition of the output parameter range.

Table I illustrates an exemplary bin partition wherein bins 401 correspond to a peak latency value for the DDR of SoC 321. Accordingly, a peak latency ranging from 0 nanoseconds (ns) up to 150,000 ns (or 150 microseconds, μs), is divided evenly into fourteen intervals (bins 401). Ranges in Table I indicate inclusive limits ("closed" set) with a square bracket (e.g. ID and exclusive limits ("open set") with round brackets (e.g., "(,)").

Table I

| Bin | Latency Ranges for Bins (ns) Latency Range |
|---|---|
| 0 | [0:3000] |
| 1 | (3000:6000] |
| 2 | (6000:10000] |
| 3 | (10000:17000] |
| 4 | (17000:20000] |
| 5 | (20000:25000] |
| 6 | (25000:30000] |
| 7 | (30000:35000] |
| 8 | (35000:40000] |
| 9 | (40000:45000] |
| 10 | (45000:50000] |

Table I-continued

| Bin | Latency Ranges for Bins (ns) Latency Range |
|---|---|
| 11 | (50000:100000] |
| 12 | (100000:150000] |
| 13 | (150000:+inf |

For each distribution 420 of output parameter values, each input parameter value may have a corresponding distribution (based on the random sampling or the constrained sampling performed by constrained optimization engine 101). The specific range of values for the output parameter and for any of the input parameters may be different along the abscissae of distribution 420 (e.g., nanoseconds for a latency output parameter, and kilobytes for a FIFO buffer length). In that regard, in some embodiments it is desirable that the number of bins spanning the parameter values be the same, or similar. In some embodiments, it is desirable that distribution 420 includes only non-zero frequency values. For example, in some embodiments distribution 420 may be selected so that at least the first bin and the last bin (e.g., bins 0 and 13, respectively) have non-zero frequency 402.

Figure 5A:
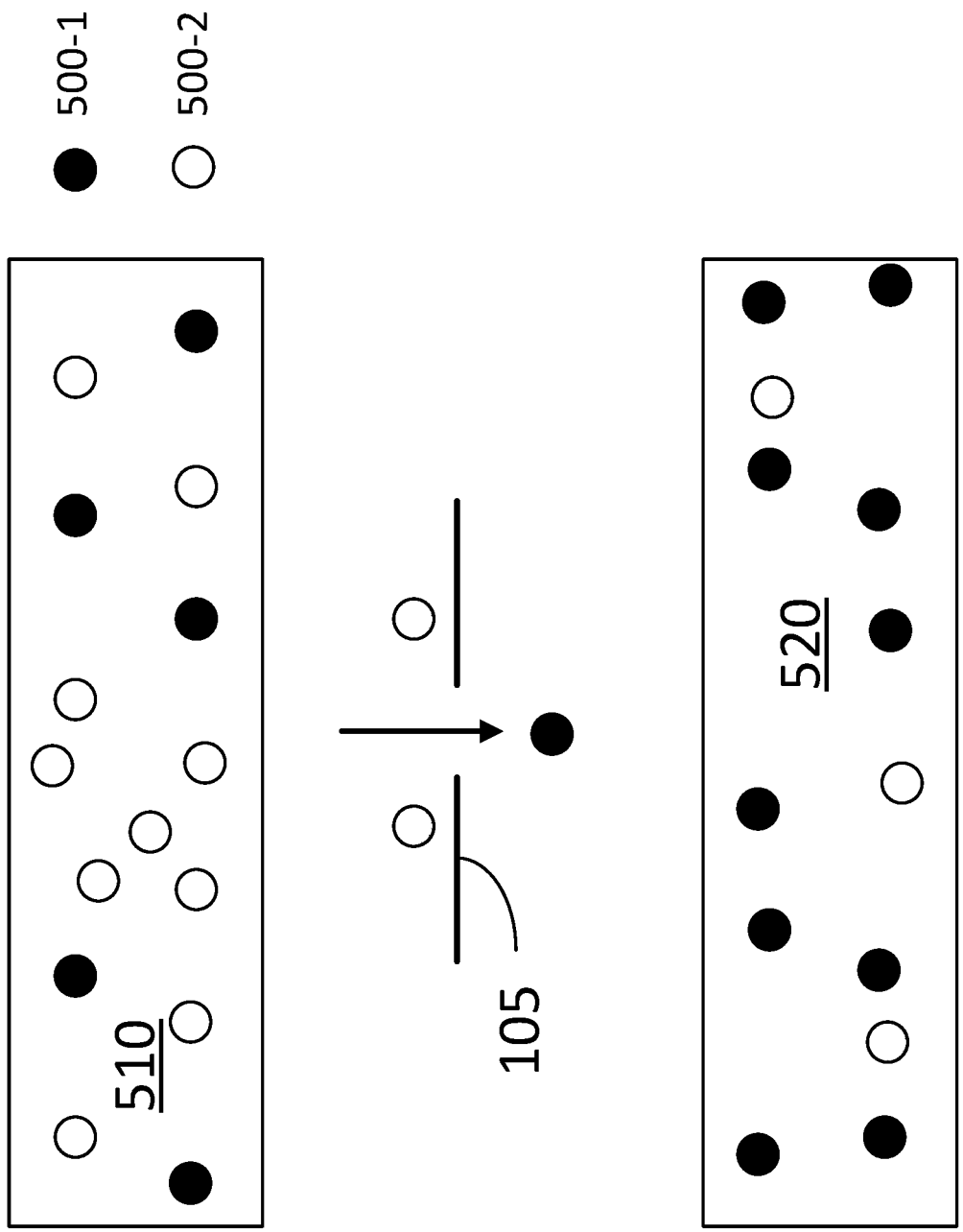
FIG. 5A illustrates a block diagram of a computer-implemented method for evaluating the quality of a SoC configuration, according to some embodiments.

FIG. 5A illustrates a block diagram of a quality predictor method for evaluating the quality of multiple SoC configurations 500-1 and 500-2 (hereinafter, collectively referred to as "device configurations 500"), according to some embodiments. Machine learning engine 105 is trained to predict the quality of a given device configuration 500 without actually simulating the SoC to determine an output parameter value. Device configurations 500 include multiple input parameters leading to an output parameter value. The specific parameter selected as an output parameter may vary according to the design concern for the user. Machine learning engine 105 predicts a "high quality" device configuration 500-1 to lead to output parameter values within the targeted coverage range. Likewise, machine-learning engine 105 predicts a "low quality" device configuration 500-2 to lead to output parameter values outside of the targeted coverage range.

Machine learning engine 105 is expected to perform more accurate and precise assessment of "high quality" and "low quality" device configurations 500-1 and 500-2, respectively, with further iterations of the routine. Accordingly, multiple device configurations 500 are randomly obtained in panel 510, and machine learning engine 105 selects (with a high degree of confidence) high quality device configurations 500-1 over low quality device configurations 500-2 in panel 520. Even after a first iteration, or maybe after a few more iterations, panel 520 includes a majority of high quality configurations 500-1. Accordingly, when a simulation tool is executed over device configurations 500 in panel 520, it is expected that a large proportion of the samples will yield output parameters within the target coverage range.

Figure 5B:
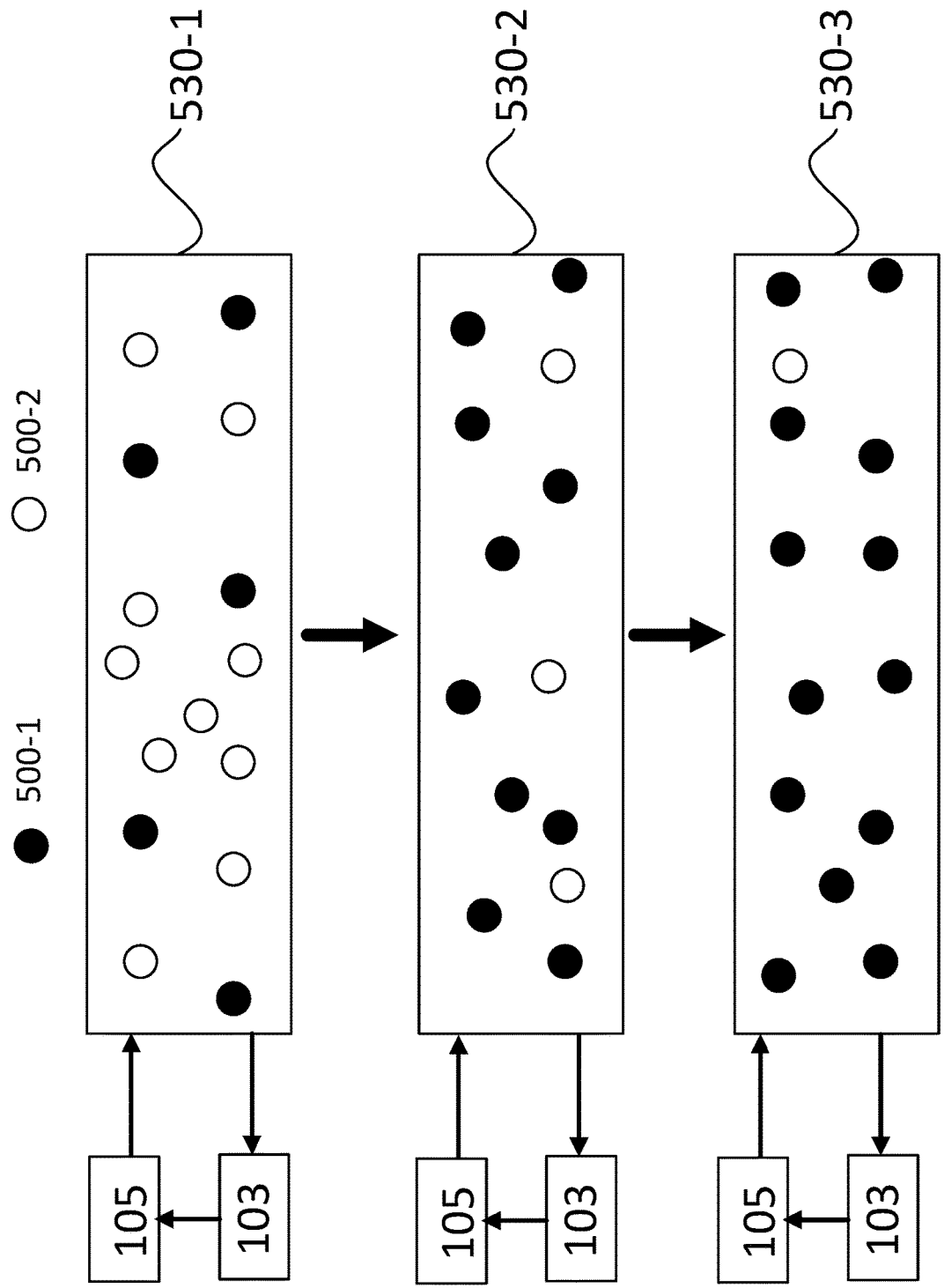
FIG. 5B illustrates a block diagram of a computer implemented method for evaluating the validity and the quality of a SoC configuration, according to some embodiments.

FIG. 5B illustrates a block diagram of a quality distribution bias method for evaluating the validity and the quality of a SoC configuration, according to some embodiments. High quality device configurations 500-1 and low quality device configurations 500-2 are as defined above. In embodiments consistent with FIG. 5B machine learning engine 105 is trained to navigate through device configurations 500 and select high quality configurations 500-1 from low quality configurations 500-2.

At each of multiple iteration steps 530-1, 530-2 and 530-3 (hereinafter, collectively referred to as "iteration steps 530"), the ability of machine learning engine 105 to select high quality configurations 500-1 increases. This is illustrated by the higher ratio of high quality device configurations 500-1 relative to low quality device configurations 500-2, as iteration steps 530 progress. New configurations 500 created automatically at each step 530 with new distribution constraints using constrained metric verification engine 103. In some embodiments, constrained metric verification engine 103 ensures that configurations 500 (whether high or low quality) are valid in the sense that are physically feasible in the SoC, and comply with one or more constraints imposed by the designer or by a physical limitation of the SoC, or an environmental parameter.

Figure 6:
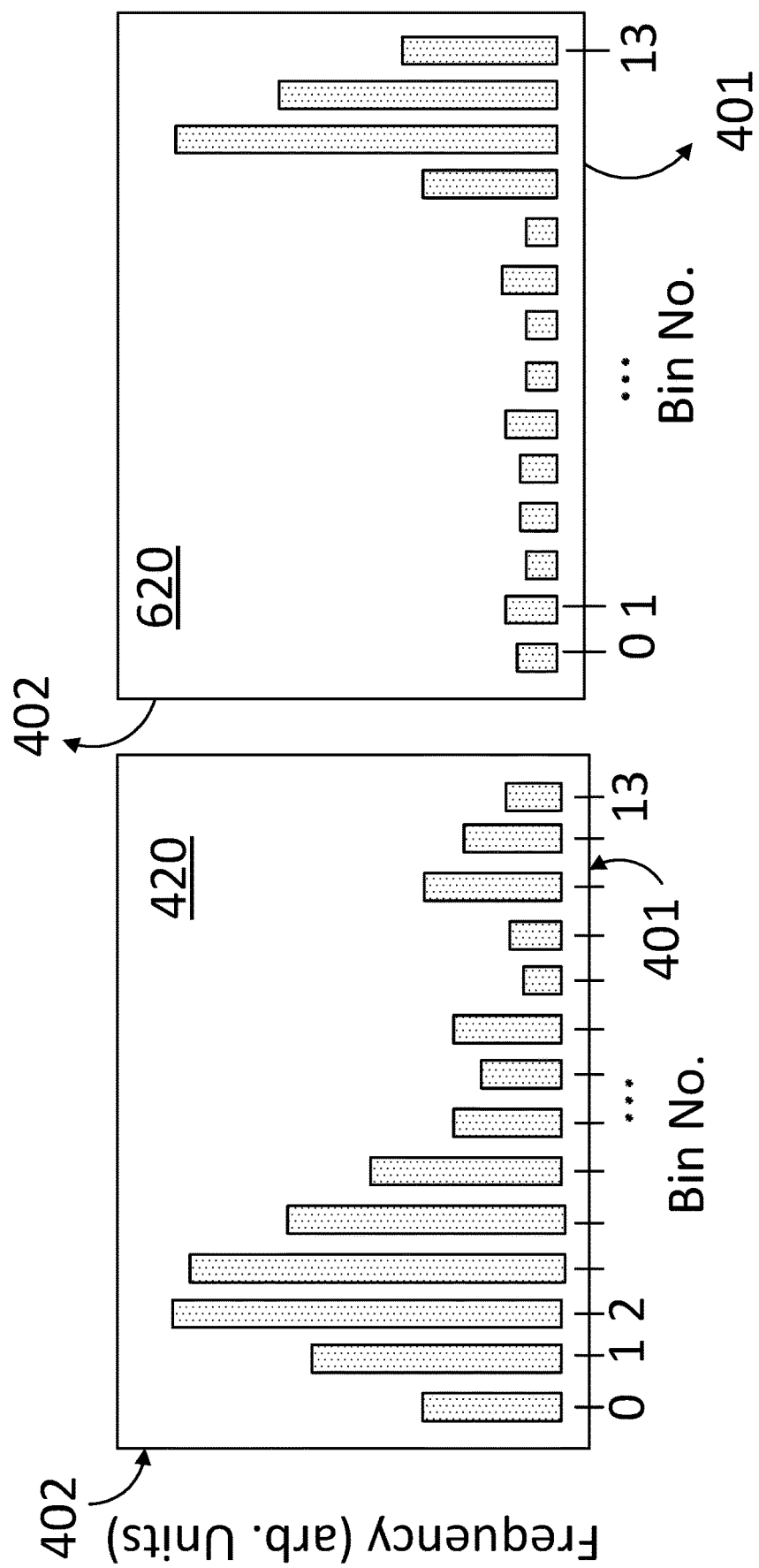
FIG. 6 illustrates a modification of an output parameter distribution over a target coverage resulting from a computer-implemented method for evaluating a SoC design, according to some embodiments.

FIG. 6 illustrates a modified of an output parameter distribution 620 over a target coverage resulting from a computer-implemented method for evaluating a SoC design, according to some embodiments. The bin partition in distribution 620 is as described in detail above with reference to distribution 420, with bins 401 in the abscissae and frequency rate 402 in the ordinates (cf. Table I). Without limitation, and for illustrative purposes only, three iterations including a machine learning engine 105 selecting high quality device configurations provided by constrained metric verification engine 103 result in distribution 620 (e.g., iteration steps 530-1, 530-2, and 530-3). In a first iteration step (e.g., iteration step 530-1), one thousand (1000) random device configurations are selected (similarly to those used for distribution 420). In the first iteration, the machine-learning engine 105 may not be very efficient to predict which device configurations will be high quality configurations, and therefore the constrained metric verification engine 103 may not provide sufficient distinction of the device configurations for the next iteration. A full simulation of the 1000 device configurations is performed and machine learning engine 105 together with constrained metric verification engine 103 are adjusted according to the results obtained. In a second iteration step (e.g., iteration step 530-2), a second set of 1000 device configurations is selected, wherein machine learning engine 105 and constrained metric verification engine 103 are further adjusted to bias the output parameter towards higher bins in distribution 620 (e.g., increase frequency 402 in bins 11, 12 and 13). Random parameter distribution 420 is illustrated for comparison.

Figure 7:
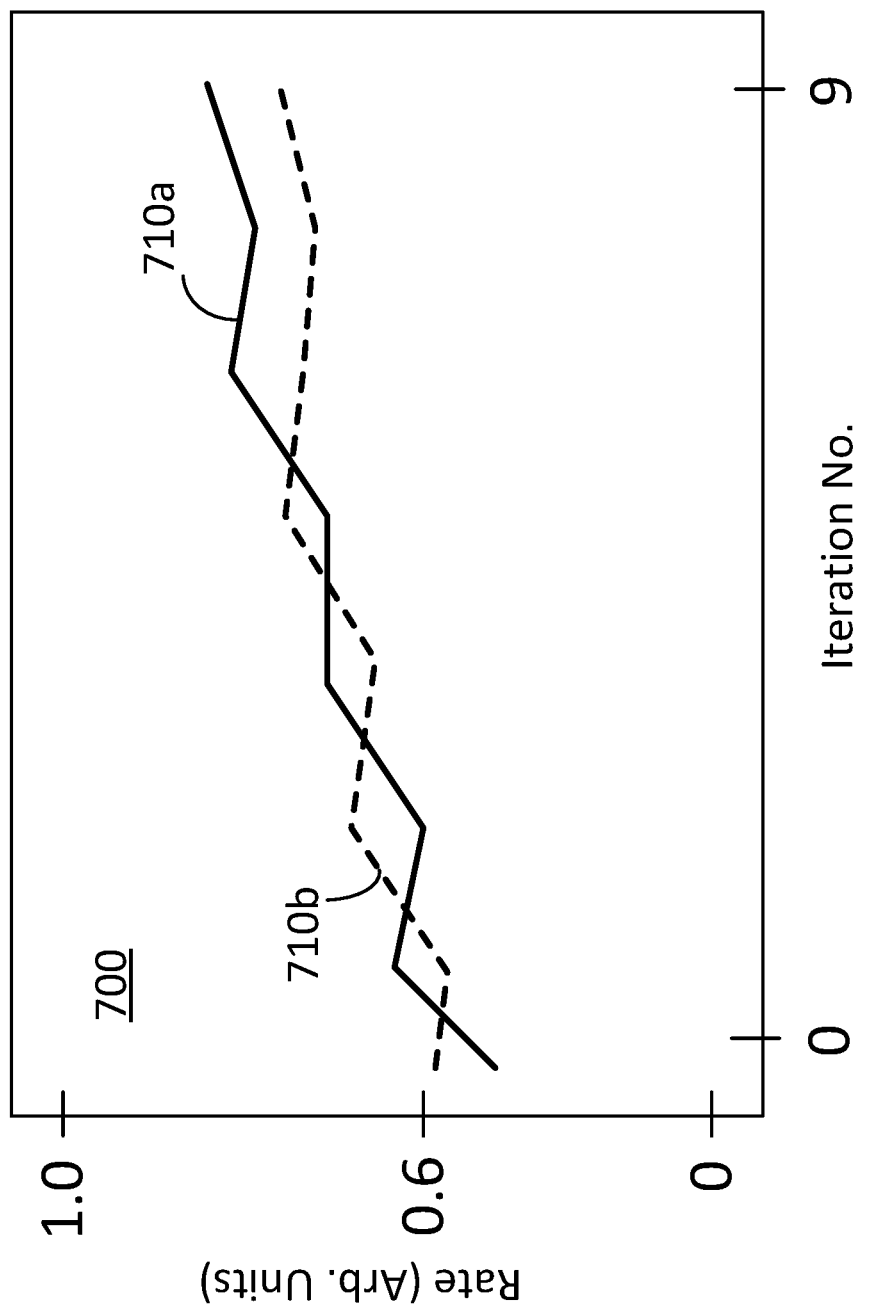
FIG. 7 illustrates a behavior chart of a computer-implemented method for evaluating the quality of a SoC configuration, according to some embodiments.

FIG. 7 illustrates a behavior chart 700 of a computer-implemented method for evaluating the quality of a SoC configuration, according to some embodiments. The abscissae in behavior chart 700 (X-axis) indicate an iteration step number, and the ordinates (Y-axis) indicate a rate value (e.g., percentage, %, of occurrence). Without limitation, each iteration in FIG. 7 includes one hundred (100) device configurations (for which the SoC is also simulated in full). Behavior chart 700 includes a precision curve 710a and a recall curve 710b.

Precision curve 710a indicates the proportion (e.g., in %) of high quality device configurations 500-1 that are certified by a full simulation run of the SoC, under the device configuration. Recall curve 710b indicates the proportion of certified (e.g., by a full simulation run of the SoC) high quality device configurations that are predicted by machine learning engine 105 to be high quality device configurations 500-1. In some embodiments, recall curve 710b indicates the diversity of high quality configurations recognizable by machine learning engine 105. In some embodiments, it is desirable to obtain a high recall rate for avid overriding of specific patterns in certain device configurations. Recall curve 710b indicates the time needed to find high quality device configurations 500-1 among randomly generated configurations 500.

Figure 8:
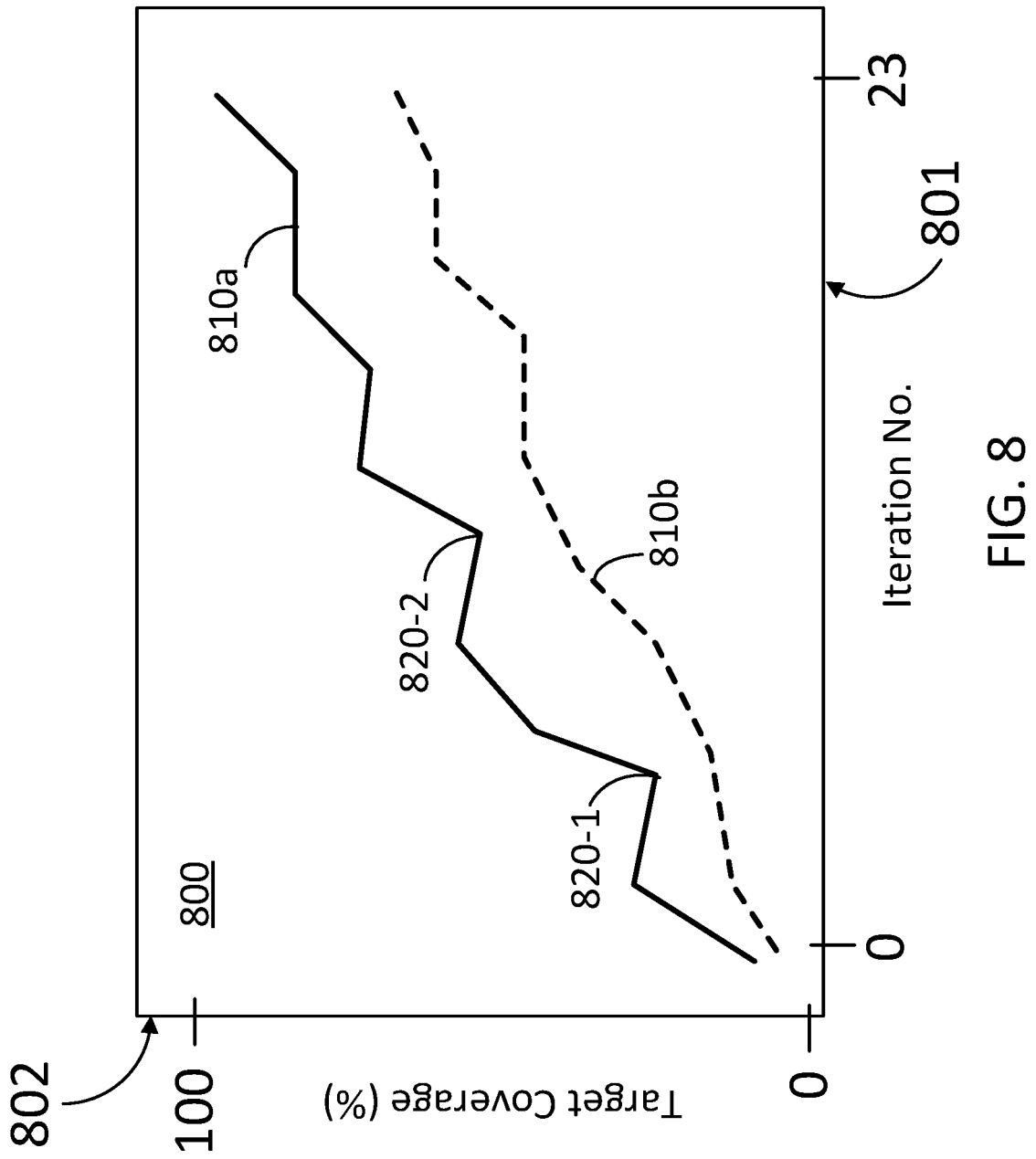
FIG. 8 illustrates a distribution progression after multiple iterations of a computer implemented method for evaluating the validity and the quality of a SoC configuration, according to some embodiments.

FIG. 8 illustrates a distribution progression 800 after multiple iterations of a computer implemented method for evaluating the validity and the quality of a SoC configuration (e.g., a DDR latency in SoC 321), according to some embodiments. The abscissae in distribution progression 800 (X-axis) indicate an iteration step number 801, and the ordinates (Y-axis) indicate a target coverage 802 (e.g., percentage, %, of desired coverage). Without limitation, each iteration in distribution progression 800 includes a total of three hundred (300) device configurations. A curve 810a indicates the coverage increase of bins 11 or higher in distribution 620, as the iteration no. progresses. A curve 810b indicates the coverage increase of the highest latency bin (e.g., bin 13, for peak latency values of 150 us or more). Curves 810a and 810b will be collectively referred to, hereinafter, as "progression curves 810." In some embodiments, target coverage 802 is calculated as the total occurrences in the selected bins for any one of curves 810, divided by the total number of device configurations used in the given iteration.

Distribution progression 800 shows the coverage increased steadily with further iterations, achieving about 90% coverage after 23 iterations (cf. curve 810a). It is noted that, for some iterations, the coverage may occasionally drops, as illustrated by points 820-1, and 820-2 (hereinafter, collectively referred to as "hill climbs 820"). Hill climbs 820 indicate that machine-learning engine 105 may look for better solutions by moving out of local minima in the input parameter space of device configurations (which typically includes hundreds of dimensions, with a complex topology). In some embodiments, hill climbs 820 are expected to become less frequent as the coverage achieves a high percentage (with further iterations).

Figure 9:
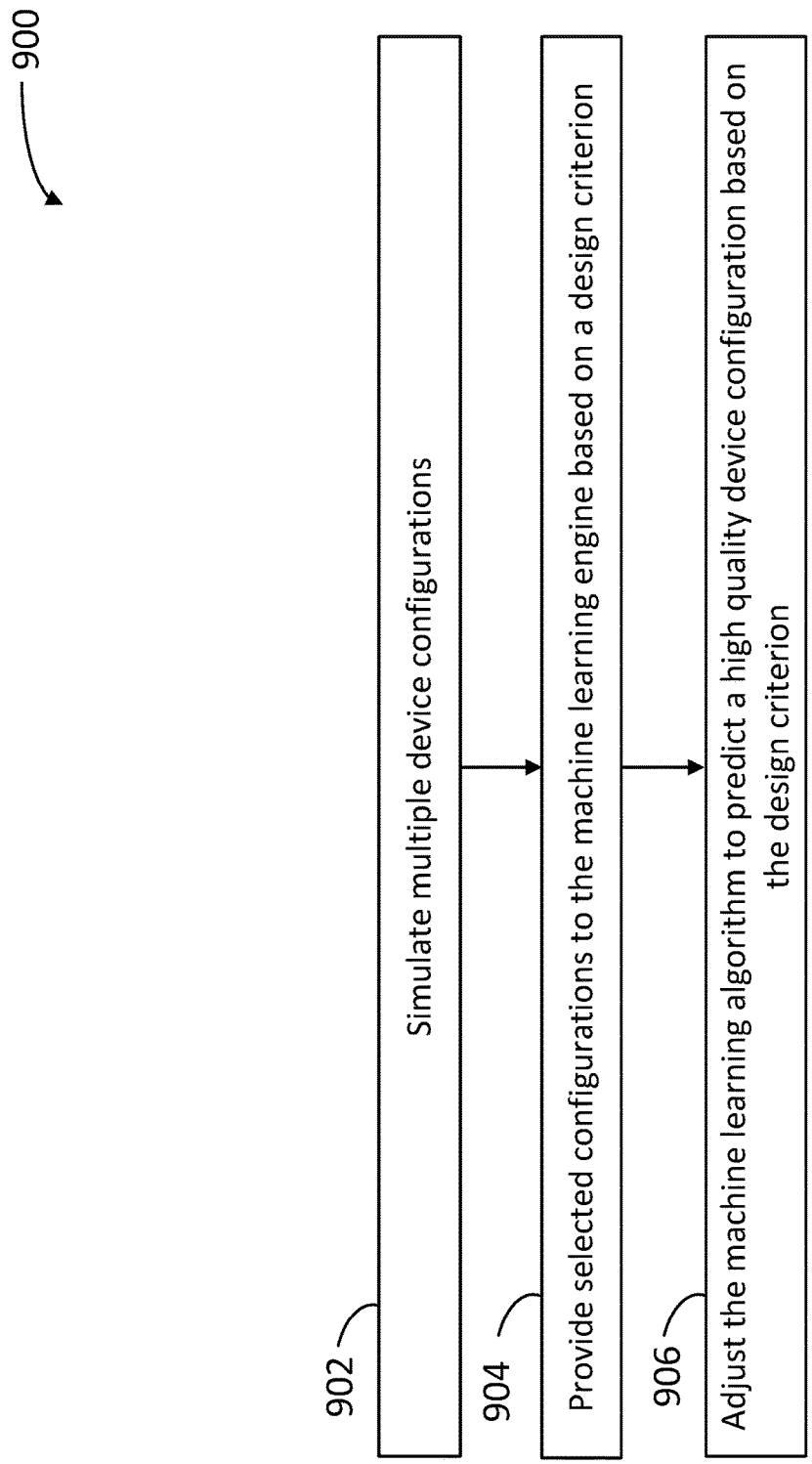
FIG. 9 is a flow chart illustrating steps in a method for creating a computer-implemented method for evaluating the quality of a SoC configuration, according to some embodiments.

FIG. 9 is a flow chart illustrating steps in a method 900 for evaluating multiple design architectures for a SoC (e.g., SoC 121, or 321), according to some embodiments. At least some of the steps in method 900 may be performed by a computer having a processor executing commands stored in a memory of the computer (e.g., client host 102 or server 100, processors 12 or 36, and memories 20 or 30). In some embodiments, at least some of the commands may be stored as part of a constrained analysis application installed in a computer (e.g., application 22 in client host 102, constrained optimization engine 101, constrained metric verification engine 103, or machine learning engine 105). Further, steps as disclosed in method 900 may include retrieving, editing, and/or storing files in a database that is part of, or is communicably coupled to, the computer (e.g., regression coverage database 140). Methods consistent with the present disclosure may include at least some, but not all of the steps illustrated in method 900, performed in a different sequence. Furthermore, methods consistent with the present disclosure may include at least two or more steps as in method 800, performed overlapping in time, or almost simultaneously.

In some embodiments, at least one or more of the steps in method 900 may be performed in a cloud computing environment, wherein a computer may include servers, such as a master server and a slave server. Accordingly, at least some of the steps illustrated in method 900 may be performed in parallel in different processors, following separate computational threads. For example, each of the separate computational threads may be performed by at least one of slave servers in each of multiple applications and processors dedicated to the specific computational thread.

Step 902 includes simulating multiple device configurations. In some embodiments, step 902 may include randomly selecting the multiple device configurations prior to the simulation. In some embodiments, step 902 may include applying a constrained bias to the multiple device configurations prior to the simulation, so as to steer the value of an output parameter in a desired region of a distribution chart.

Step 904 includes providing selected configurations to the machine learning engine based on a design criterion.). In some embodiments, step 904 includes defining an output parameter suitably extracted from raw data from the completed simulation (e.g., as stored in the database).

Step 906 includes adjusting the machine-learning algorithm to predict a high quality device configuration based on the design criterion. In some embodiments, step 906 includes identifying statistical relations between input variables and a selected output parameter, and identifying input settings to steer the regression for better coverage.

Figure 10:
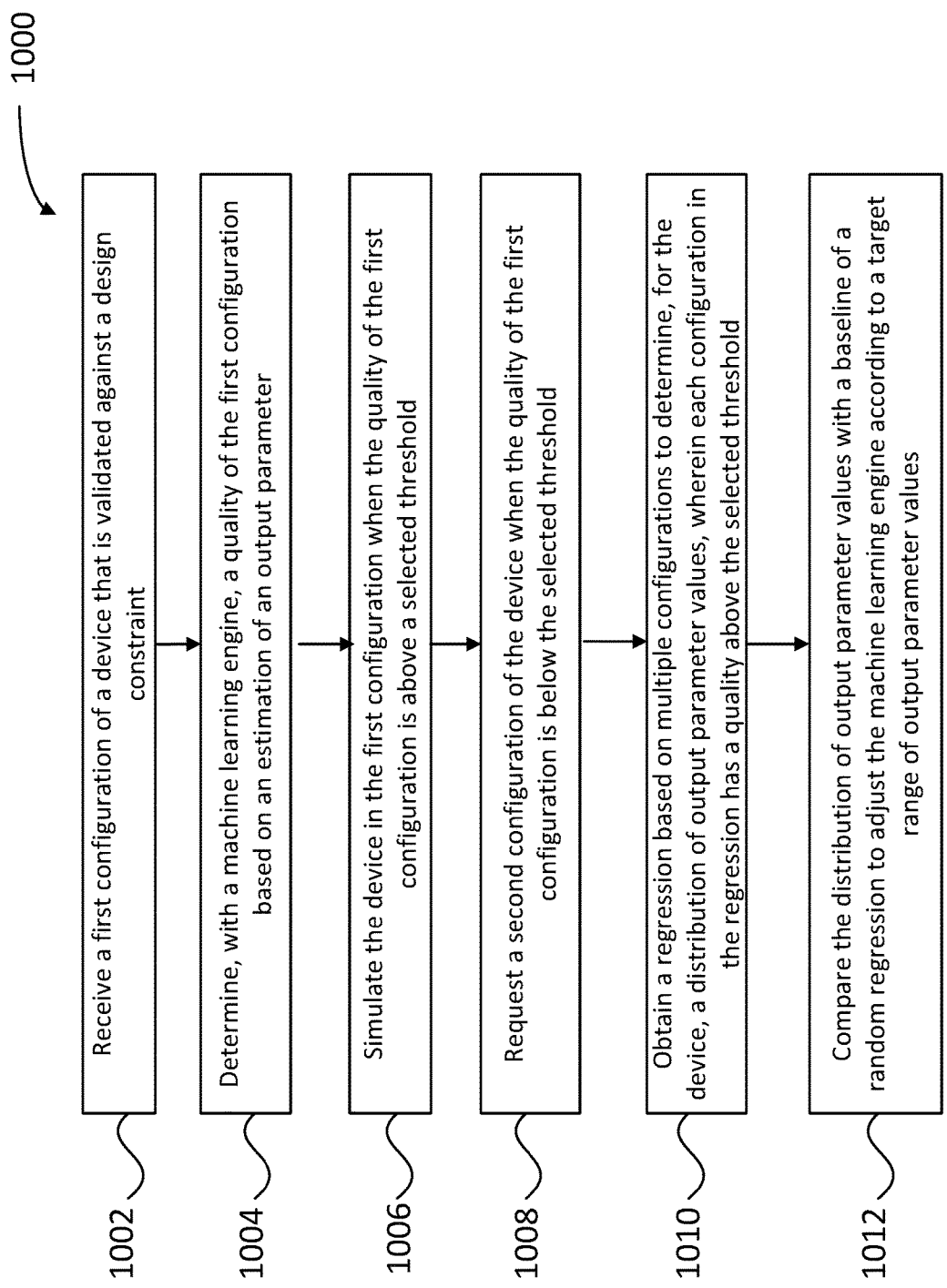
FIG. 10 is a flow chart illustrating steps in a method for using a computer-implemented method to evaluate the quality of a SoC configuration, according to some embodiments.

FIG. 10 is a flow chart illustrating steps in a method 1000 for evaluating a statistical sensitivity in a design architecture of a SoC, according to some embodiments (e.g., SoC 121, or 321). At least some of the steps in method 1000 may be performed by a computer having a processor executing commands stored in a memory of the computer (e.g., client host 102 or server 100, processors 12 or 36, and memories 20 or 30). In some embodiments, at least some of the commands may be stored as part of an analysis engine application installed in a computer (e.g., application 22 in client host 102, constrained optimization engine 101, constrained metric verification engine 103, or machine learning engine 105). Further, steps as disclosed in method 1000 may include retrieving, editing, and/or storing files in a database that is part of, or is communicably coupled to, the computer (e.g., regression coverage database 140). Methods consistent with the present disclosure may include at least some, but not all of the steps illustrated in method 1000, performed in a different sequence. Furthermore, methods consistent with the present disclosure may include at least two or more steps as in method 1000, performed overlapping in time, or almost simultaneously.

In some embodiments, at least one or more of the steps in method 1000 may be performed in a cloud computing environment, wherein a computer may include servers, such as a master server and a slave server. Accordingly, at least some of the steps illustrated in method 1000 may be performed in parallel in different processors, following separate computational threads. For example, each of the separate computational threads may be performed by at least one of slave servers in each of multiple applications and processors dedicated to the specific computational thread.

Step 1002 includes receiving a first configuration of a device that is validated against a design constraint. In some embodiments, step 1002 includes retrieving a valid device configuration from a constraint solver. In some embodiments, step 1002 includes validating, with a constraint solver, the first configuration.

Step 1004 includes determining, with the machine-learning engine, a quality of the first configuration based on an estimation of an output parameter. In some embodiments, the output parameter includes a desired behavior for the device (e.g., a desired performance specification). In some embodiments, a quality of a configuration includes estimating a value of an output parameter within a pre-selected target range, and step 1004 includes evaluating a probability that the value of the output parameter for the first configuration will fall within the pre-selected target range. In some embodiments, step 1004 includes comparing an output parameter value from the first configuration with a distribution of output parameter values obtained from multiple random samples of configurations. In some embodiments, step 1004 includes modifying the machine-learning engine based on a predicted quality of the first configuration and an evaluated quality of the first configuration. In some embodiments, the device is a system on a chip, and step 1004 includes comparing a peak latency of a function in the system on a chip with a high latency value selected from a random sampling of the system on a chip.

Step 1006 includes simulating the device in the first configuration when the quality of the first configuration is above the selected threshold. In some embodiments, step 1006 includes simulating the device configuration when the quality is above a selected threshold. In some embodiments, step 1006 includes simulating the device in the first configuration to obtain a value of an output parameter of the device.

Step 1008 includes requesting a second configuration of the device when the quality of the first configuration is below the selected threshold. In some embodiments, step 1008 includes providing the second configuration based on the design constraint and an increased probability that a quality of the second configuration is higher than the selected threshold. Accordingly, in some embodiments, step 1008 includes validating, with a constraint solver, the second configuration. In some embodiments, step 1008 includes selecting a second threshold higher than the selected threshold to evaluate a quality of the second configuration. In some embodiments, step 1008 includes dynamically adjust a target coverage for an output parameter of a SoC from regression raw data based on the quality of the first configuration, as multiple configurations are tested.

Step 1010 includes obtaining a regression based on multiple configurations, each of the multiple configurations having a high quality (e.g., the quality being greater than the selected threshold), to determine, for the device, a distribution of output parameter values. In some embodiments, step 1010 includes selecting each of the multiple configurations for the regression such that the quality of each of the multiple configurations is above the selected threshold. In some embodiments, step 1010 is performed in the constrained metric verification engine to select further configurations of the device that better target a desired output parameter value. In some embodiments, step 1010 includes providing a distribution of output parameter values from the device using one of the first configuration or the second configuration based on the quality of the first configuration. In some embodiments, step 1010 includes evaluating a rate of return of the machine-learning engine based on a frequency of requests for a second configuration when multiple first configurations are received.

Step 1012 includes comparing the distribution of output parameter values with a baseline of a random regression to adjust the machine learning engine according to a target range of output parameter values.

Hardware Overview

Figure 11:
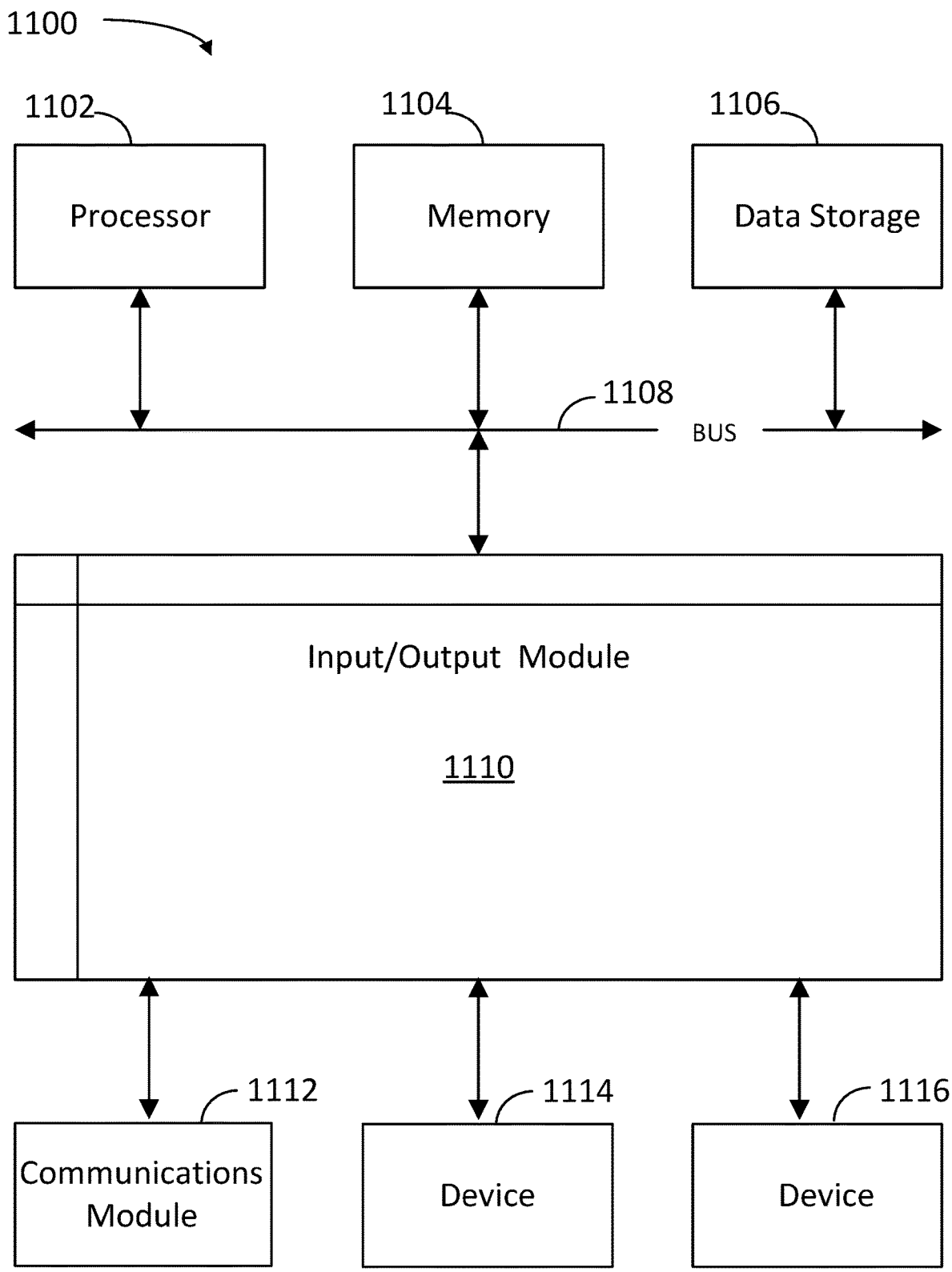
FIG. 11 is a block diagram illustrating an example computer system for generating target coverage of an output parameter in a SoC, according to some embodiments.

FIG. 11 is a block diagram illustrating an example computer system 1100 with which the methods and steps illustrated in methods 900-1000 can be implemented, according to some embodiments. In certain aspects, computer system 1100 can be implemented using hardware or a combination of software and hardware, either in a dedicated server, integrated into another entity, or distributed across multiple entities.

Computer system 1100 includes a bus 1108 or other communication mechanism for communicating information, and a processor 1102 coupled with bus 1108 for processing information. By way of example, computer system 1100 can be implemented with one or more processors 1102. Processor 1102 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 1102 may include modules and circuits configured as a 'placing' tool or engine, or a 'routing' tool or engine, to place devices and route channels in a circuit layout, respectively and as disclosed herein.

Computer system 1100 includes, in addition to hardware, code that creates an execution environment for the computer program in question, e.g., code that constitutes processor firmware, a protocol stack, a database management system, an operating system, or a combination of one or more of them stored in an included memory 1104, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1108 for storing information and instructions to be executed by processor 1102. Processor 1102 and memory 1104 can be supplemented by, or incorporated in, special purpose logic circuitry.

The instructions may be stored in memory 1104 and implemented in one or more computer program products, e.g., one or more modules of computer program instructions encoded on a computer readable medium for execution by, or to control the operation of, the computer system 1100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 1104 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1100 further includes a data storage device 1106 such as a magnetic disk or optical disk, coupled to bus 1108 for storing information and instructions.

Computer system 1100 is coupled via input/output module 1110 to various devices. The input/output module 1110 is any input/output module. Example input/output modules 1110 include data ports such as USB ports. The input/output module 1110 is configured to connect to a communications module 1112. Example communications modules 1112 include networking interface cards, such as Ethernet cards and modems. In certain aspects, the input/output module 1110 is configured to connect to a plurality of devices, such as an input device 1114 and/or an output device 1116. Example input devices 1114 include a keyboard and a pointing device, e.g., a mouse or a trackball, by which a user can provide input to the computer system 1100. Other kinds of input devices 1114 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a LED (light emitting diode), CRT (cathode ray tube), or LCD (liquid crystal display) screen, for displaying information to the user.

Methods as disclosed herein may be performed by computer system 1100 in response to processor 1102 executing one or more sequences of one or more instructions contained in memory 1104. Such instructions may be read into memory 1104 from another machine-readable medium, such as data storage device 1106. Execution of the sequences of instructions contained in main memory 1104 causes processor 1102 to perform the process steps described herein (e.g., as in methods 900-1000). One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 1100 includes servers and personal computer devices. A personal computing device and server are generally remote from each other and typically interact through a communication network. The relationship of client and server arises by virtue of computer programs running on the respective computers and having a client-server relationship to each other. Computer system 1100 can be, for example, and without limitation, a desktop computer, laptop computer, or tablet computer. Computer system 1100 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 1102 for execution. Such a medium may take many forms, including, but not limited to, non-volatile media, volatile media, and transmission media. Non-volatile media include, for example, optical disks, magnetic disks, or flash memory, such as data storage device 1106. Volatile media include dynamic memory, such as memory 1104. Transmission media include coaxial cables, copper wire, and fiber optics, including the wires that comprise bus 1108. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method, comprising:
    receiving a first configuration of a device, wherein a configuration comprises stimuli controls and stimuli parameters used as inputs in a device model, and wherein the first configuration is validated against a design constraint;
    determining, with a machine learning engine, a quality of the first configuration based on an estimation of an output parameter, wherein the quality of the first configuration is determined by comparing an output parameter value from the first configuration with a distribution of output parameter values obtained from multiple random samples of configurations, and the output parameter comprises a desired behavior of the device;
    simulating the device in the first configuration of the device when the quality of the first configuration is above a selected threshold;
    requesting a second configuration of the device when the quality of the first configuration is below the selected threshold;
    obtaining a regression based on multiple configurations to determine, for the device, a distribution of output parameter values, wherein each configuration in the regression has a quality above the selected threshold; and
    comparing the distribution of output parameter values with a baseline of a random regression to adjust the machine learning engine according to a target range of output parameter values.

2. The computer-implemented method of claim 1, wherein receiving the first configuration of a device comprises selecting the first configuration of the device using a constrained metric verification engine.

3. The computer-implemented method of claim 1, wherein a quality of a configuration comprises a value of an output parameter of the configuration of the device being within the target range of output parameter values, and determining the quality of the first configuration comprises evaluating a probability that the value of the output parameter for the first configuration will fall within the target range of output parameter values.

4. The computer-implemented method of claim 1, wherein the device is a system on a chip, and determining a quality of the first configuration comprises comparing a peak latency of a function in the system on a chip with a high latency value selected from a random sampling of the system on a chip.

5. The computer-implemented method of claim 1, wherein performing a regression based on multiple configurations comprises selecting multiple configurations such that a quality of each of the configurations is above the selected threshold.

6. The computer-implemented method of claim 1, wherein simulating the device in the first configuration of the device comprises obtaining a value of an output parameter of the device when the device is configured in the first configuration of the device.

7. The computer-implemented method of claim 1, further comprising providing the second configuration based on the design constraint and an increased probability that a quality of the second configuration is higher than the selected threshold.

8. The computer-implemented method of claim 1, further comprising selecting a second threshold no less than the selected threshold to evaluate a quality of the second configuration.

9. The computer-implemented method of claim 1, further comprising dynamically adjusting the target range of output parameter values based on a distribution of simulated values of the output parameter for multiple configurations of the device.

10. A system, comprising:
a memory, storing instructions; and
at least one processor that executes the instructions to:
- receive a first configuration of a device, wherein a configuration comprises stimuli controls and stimuli parameters used as inputs in a device model, and wherein the first configuration is validated against a design constraint;
- determine, with a machine learning engine, a quality of the first configuration based on an estimation of an output parameter, wherein the quality of the first configuration is determined by comparing an output parameter value from the first configuration with a distribution of output parameter values obtained from multiple random samples of configurations, and the output parameter comprises a desired behavior of the device;
- simulate the device in the first configuration of the device when the quality of the first configuration is above a selected threshold;
- request a second configuration of the device when the quality of the first configuration is below the selected threshold;
- obtain a regression based on multiple configurations to determine, for the device, a distribution of output parameter values, wherein each configuration in the regression has a quality above the selected threshold; and
- compare the distribution of output parameter values with a baseline of a random regression to adjust the machine learning engine according to a target range of output parameter values.

11. The system of claim 10, wherein to receive the first configuration of a device the at least one processor executes instructions to select the first configuration of the device using a constrained metric verification engine.

12. The system of claim 10, wherein a quality of a configuration comprises a value of an output parameter of the configuration of the device being within the target range of output parameter values, and to determine the quality of the first configuration the at least one processor executes instructions to evaluate a probability that the value of the output parameter for the first configuration will fall within the target range of output parameter values.

13. The system of claim 10, wherein the device is a system on a chip, and to determine a quality of the first configuration the at least one processor executes instructions to compare a peak latency of a function in the system on a chip with a high latency value selected from a random sampling of the system on a chip.

14. The system of claim 10, wherein to perform a regression based on multiple configurations including at least the first configuration the at least one processor executes instructions to select the configurations such that a quality of each of the configurations is above the selected threshold.

15. The system of claim 10, wherein to simulate the device in the first configuration the at least one processor executes instructions to obtain a value of an output parameter of the device when the device is configured in the first configuration of the device.

16. A non-transitory, computer-readable medium comprising instructions stored in a memory which, when executed by a processor cause a computer to perform a method, the method comprising:
- receiving a first configuration of a device, wherein a configuration comprises stimuli controls and stimuli parameters used as inputs in a device model, and wherein the first configuration is validated against a design constraint;
- determining, with a machine learning engine, a quality of the first configuration based on an estimation of an output parameter, wherein the quality of the first configuration is determined by comparing an output parameter value from the first configuration with a distribution of output parameter values obtained from multiple random samples of configurations, and the output parameter comprises a desired behavior of the device;
- simulating the device in the first configuration when the quality of the first configuration is above a selected threshold;
- requesting a second configuration of the device when the quality of the first configuration is below the selected threshold;
- obtaining a regression based on multiple configurations to determine, for the device, a distribution of output parameter values, wherein each configuration in the regression has a quality above the selected threshold; and
- comparing the distribution of output parameter values with a baseline of a random regression to adjust the machine learning engine according to a target range of output parameter values.

17. The non-transitory, computer-readable medium of claim 16, wherein the method comprises receiving a first configuration comprises validating, with a constrained optimization engine, the first configuration.

18. The non-transitory, computer-readable medium of claim 16, wherein a quality of a configuration comprises a value of an output parameter within a pre-selected target range, the method comprising determining the quality of the first configuration comprises evaluating a probability that the value of the output parameter for the first configuration will fall within the pre-selected target range.

* * * * *